W. H. DENNEY.
Machines for Slotting Links for Locomotives.

No. 140,121. Patented June 24, 1873.

Attest: Inventor:

UNITED STATES PATENT OFFICE.

WILLIAM H. DENNEY, OF PHILADELPHIA, PENNSYLVANIA, ASSIGNOR OF ONE-THIRD OF HIS RIGHT TO JOHN F. KING, OF SAME PLACE.

IMPROVEMENT IN MACHINES FOR SLOTTING LINKS FOR LOCOMOTIVES.

Specification forming part of Letters Patent No. 140,121, dated June 24, 1783; application filed February 15, 1873.

*To all whom it may concern:*

Be it known that I, WILLIAM H. DENNEY, of the city of Philadelphia and State of Pennsylvania, have invented certain Improvements in Machinery for Forming the Slots in Links for Locomotives and other Steam-Engines, of which the following is a specification:

My invention relates to the combination of a rotary cutter and revolving index-plate in such manner that the link in which the slot is being formed shall be fed up to the cutter in the exact radius of the circle required in the link; the object of my invention being to secure the greatest degree of exactness in forming the slot by the revolving cutter, and thereby avoid the tedious and expensive operation of hand-labor in finishing the slot.

Figure 1:
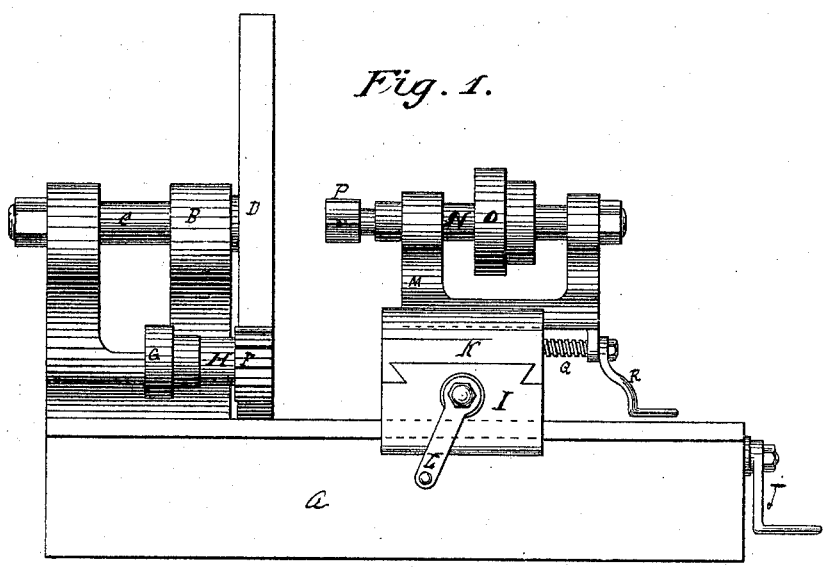
Figure 2:
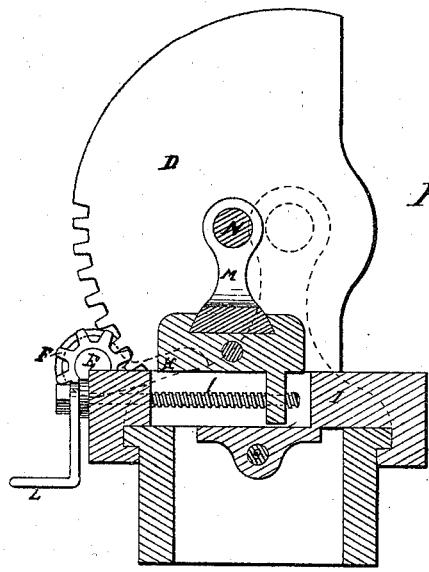

Figure 1 is a side elevation of the machine embodying my invention. Fig. 2 is an end section.

A is the bed of the machine, which should be substantially constructed to resist the vibrations of the operating parts. B is the head which carries the mandrel C, and to which the index-plate D is secured. E is a counter-shaft on which pinion F and cone-pulley G are secured. Said shaft revolves in stand H secured to the base of head B. On a portion of the circumference of index-plate D cogs are formed with which pinion F engages, thereby giving a limited revolving motion to the plate. The head B is inclined over at the top, thereby placing the mandrel to one side of the center of the bed, the object being to keep the index-plate, which is necessarily large, from extending too much in front of the bed. I is a carriage, which slides back and forth on the bed by means of a screw, to which crank J is attached. K is a head which moves back and forth on carriage I, and is operated, by a screw and crank, L, in a transverse direction to the bed. M is a head with a mandrel, N, and cone-pulley O, which is revolved by means of a belt passing over the pulley O. P is a cutter or milling-tool secured to the front end of the mandrel, which, by its rotary motion, cuts the slot in the link, which is bolted securely to the face-plate. The head M slides in head K, and is operated by means of the screw Q and crank R to set the cutter up to the work and withdraw it when necessary.

The link being firmly secured to the index-plate, previous to which a hole equal to the width of the slot is drilled to admit the milling-tool which is to be inserted, the feed is regulated by the motion of the pulleys G to suit the cutting of the tool.

Tools of different sizes may be used, if necessary, to cut any desired width of slot.

I claim as my invention—

The combination of bed A, head B, mandrel C, index-plate D, carriage I and K, head M, mandrel N, and cutter P, substantially as and for the purpose hereinbefore set forth.

WM. H. DENNEY.

Witnesses:
SAMUEL L. DENNEY,
MAGGIE DENNEY.